(12) United States Patent  
Oh

(10) Patent No.: US 8,593,655 B2
(45) Date of Patent: Nov. 26, 2013

(54) HOST APPARATUS AND SYSTEM FINISHING METHOD THEREOF

(75) Inventor: Myoung-jin Oh, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1339 days.

(21) Appl. No.: 11/650,953

(22) Filed: Jan. 9, 2007

(65) Prior Publication Data

US 2007/0171469 A1    Jul. 26, 2007

(30) Foreign Application Priority Data

Jan. 24, 2006  (KR) .................................. 2006-7351

(51) Int. Cl.
G06K 15/00    (2006.01)
(52) U.S. Cl.
USPC ......................................................... 358/1.14
(58) Field of Classification Search
USPC .................................................. 358/1.14, 1.15
See application file for complete search history.

(56) References Cited

U.S. PATENT DOCUMENTS

| | | | | | |
|---|---|---|---|---|---|
| 5,907,675 | A | * | 5/1999 | Aahlad .......................... | 709/203 |
| 2003/0115323 | A1 | | 6/2003 | Nam | |
| 2004/0141006 | A1 | * | 7/2004 | Livingston ..................... | 345/771 |
| 2004/0258444 | A1 | * | 12/2004 | Okada et al. ..................... | 400/76 |
| 2006/0007469 | A1 | * | 1/2006 | Uruma ........................ | 358/1.14 |
| 2006/0028661 | A1 | * | 2/2006 | Uruma ........................... | 358/1.6 |
| 2006/0044572 | A1 | * | 3/2006 | Nakayama ..................... | 358/1.1 |
| 2006/0227368 | A1 | * | 10/2006 | Hong .......................... | 358/1.15 |

FOREIGN PATENT DOCUMENTS

| | | |
|---|---|---|
| JP | 5-345462 | 12/1993 |
| KR | 1997-0008816 A | 2/1997 |
| KR | 1997-63720 | 12/1997 |
| KR | 1999-78779 | 11/1999 |
| KR | 2000-32752 | 6/2000 |
| KR | 10-2000-0038474 | 7/2000 |
| KR | 10-2001-0010301 | 2/2001 |
| KR | 2003-50898 | 6/2003 |

OTHER PUBLICATIONS

Office Action issued in Korean Application No. 2006-7351 on Jun. 27, 2007.
Korean Decision of Rejection for corresponding Korean Patent Application No. 10-2006-0007351 dated Dec. 26, 2007.
Korean Trial Decision for corresponding Korean Patent Application No. 10-2006-0007351 dated Jul. 31, 2008.

* cited by examiner

*Primary Examiner* — Benny Q Tieu
*Assistant Examiner* — Sunil Chacko
(74) *Attorney, Agent, or Firm* — Staas & Halsey LLP

(57) ABSTRACT

A system finishing method of a host apparatus communicating with an image forming apparatus for performing a printing operation, comprises: selecting system-finishing in an OS (operation system) of the host apparatus; confirming the presence or absence of a printing operation of the host apparatus; and if it is confirmed that there exists the printing operation of the host apparatus, displaying a finish selection message indicating an after-print system finish item.
Thus, the present invention provides a host apparatus, which is capable of promoting user's convenience at the time of system-finishing of the host apparatus by providing a user with a finish selection message indicating that the host apparatus is automatically finished after a printing operation is completed, when the user selects the system-finishing of the host apparatus during the printing operation, and a system finishing method thereof.

19 Claims, 3 Drawing Sheets

HOST APPARATUS AND SYSTEM FINISHING METHOD THEREOF

CROSS-REFERENCE TO RELATED APPLICATION

This application claims the benefit of Korean Patent Application No. 2006-7351, filed Jan. 24, 2006 in the Korean Intellectual Property Office, the disclosure of which is incorporated herein by reference.

BACKGROUND OF THE INVENTION

1. Field of the Invention

Aspects of the present invention relate to a host apparatus and a system finishing method thereof, and, more particularly, to a host apparatus, which is capable of promoting a user's convenience at the time of system-finishing of the host apparatus, and a system finishing method thereof.

2. Description of the Related Art

In general, an image forming apparatus, such as a printer, a multifunction copier or the like, is connected to a host apparatus, such as a computer, for data communication therebetween, and receives printing data from the host apparatus. Then, the image forming apparatus converts the received printing data into a print language that meets pre-set print conditions and performs a printing operation on a record medium (e.g., paper, transparency, etc.) using colored dyes such as ink or toner.

Such an image forming apparatus is an essential and indispensable office automation apparatus along with a computer. In order for the image forming apparatus to print a document made in the computer, the computer requires a printer driver to control a driving of the image forming apparatus. When a user instructs the computer to execute a print instruction through the printer driver, the printing data corresponding to the document made by the printer driver are transferred from the computer to the image forming apparatus.

When the computer executes the print instruction, there is a difference between a transfer processing time required for the printer driver to transfer the printing data to the image forming apparatus, including a time required for a conversion of the document into the printing data for printing, and a transfer completion time required for the computer to transfer the printing data to the image forming apparatus. That is, the transfer completion time is longer than the transfer processing time.

So, when the user wishes to turn off the computer after the computer performs the transfer process of transferring the printing data to the image forming apparatus, the user may be inconvenienced in that the user may have to wait before turning the computer off until after the transfer is completed. In addition, when the user turns the computer off in a condition where the transfer has not yet been completed, the user may be additionally inconvenienced in that the entire transfer operation, including the transferring of the printing data that was transferred before the computer was turned off, has to be performed when the computer is turned on again.

SUMMARY OF THE INVENTION

Accordingly, it is an aspect of the present invention to provide a host apparatus, which is capable of promoting a user's convenience at the time of system-finishing of the host apparatus by providing a user with a finish selection message indicating that the host apparatus is automatically finished after a printing operation is completed, when the user selects the system-finishing of the host apparatus during the printing operation, and a system finishing method thereof.

The foregoing and/or other aspects of the present invention are also achieved by providing a system finishing method of a host apparatus communicating with an image forming apparatus for performing a printing operation, comprising: selecting system-finishing in an OS (operation system) of the host apparatus; confirming the presence or absence of a printing operation of the host apparatus; and if it is confirmed that there exists the printing operation of the host apparatus, displaying a finish selection message indicating an after-print system finish item.

According to the embodiment of the present invention, the system finishing method further comprises: when the after-print system finish item is selected from the displayed finish selection message, finishing the system after completing the printing operation.

According to the embodiment of the present invention, the displaying the finish selection message comprises displaying the after-print system finish item added to a basic finish selection message including general system finish items.

According to the embodiment of the present invention, the displaying the finish selection message comprises displaying a basic finish selection message including general system finish items and the finish selection message indicating the after-print system finish item, separately.

According to the embodiment of the present invention, the system finishing method further comprises: if it is confirmed that there exists no printing operation of the host apparatus, displaying the basic finish selection message including the general system finish items.

According to the embodiment of the present invention, the selecting the system-finishing comprises selecting a Windows shutdown program.

According to the embodiment of the present invention, the confirming the presence or absence of the printing operation of the host apparatus comprises confirming whether printing data are transferred from the host apparatus to the image forming apparatus.

According to the embodiment of the present invention, the confirming whether the printing data are transferred from the host apparatus to the image forming apparatus comprises confirming whether the printing operation is stored in a spooler for transferring the printing data to the image forming apparatus.

The foregoing and/or other aspects of the present invention are also achieved by providing a host apparatus communicating with an image forming apparatus for performing a printing operation, comprising: a user input part for selecting system-finishing in an OS of the host apparatus; an interface connected to the image forming apparatus for transferring printing data to the image forming apparatus; and a controller for confirming the presence or absence of a printing operation based on the interface when the system-finishing is selected through the user input part, and, if it is confirmed that there exists the printing operation, displaying a finish selection message indicating an after-print system finish item.

According to the embodiment of the present invention, when the after-print system finish item is selected from the displayed finish selection message through the user input part, the controller finishes the system after completing the printing operation.

According to the embodiment of the present invention, if it is confirmed that there exists the printing operation, the controller displays the after-print system finish item added to a basic finish selection message including general system finish items.

According to the embodiment of the present invention, if it is confirmed that there exists the printing operation, the controller displays a basic finish selection message including general system finish items and the finish selection message indicating the after-print system finish item, separately.

According to the embodiment of the present invention, if it is confirmed that there exists no printing operation, the controller displays the basic finish selection message including the general system finish items.

According to the embodiment of the present invention, the interface comprises a connecting port connected to the image forming apparatus and a spooler for transferring the printing data to the image forming apparatus via the connecting port.

According to the embodiment of the present invention, the controller comprises a spooler determining part for determining a transfer state of the printing data transferred to the image forming apparatus based on the spooler and a finish controlling part for controlling the spooler determining part to confirm the transfer state of the printing data when the system-finishing is selected through the user input part, and, if it is confirmed by the spooler determining part that the printing data are being transferred to the image forming apparatus, displaying the finish selection message indicating the after-print system finish item.

According to the embodiment of the present invention, if it is confirmed by the spooler determining part that the printing data are not being transferred to the image forming apparatus, the finish controlling part displays a basic finish selection message including general system finish items.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
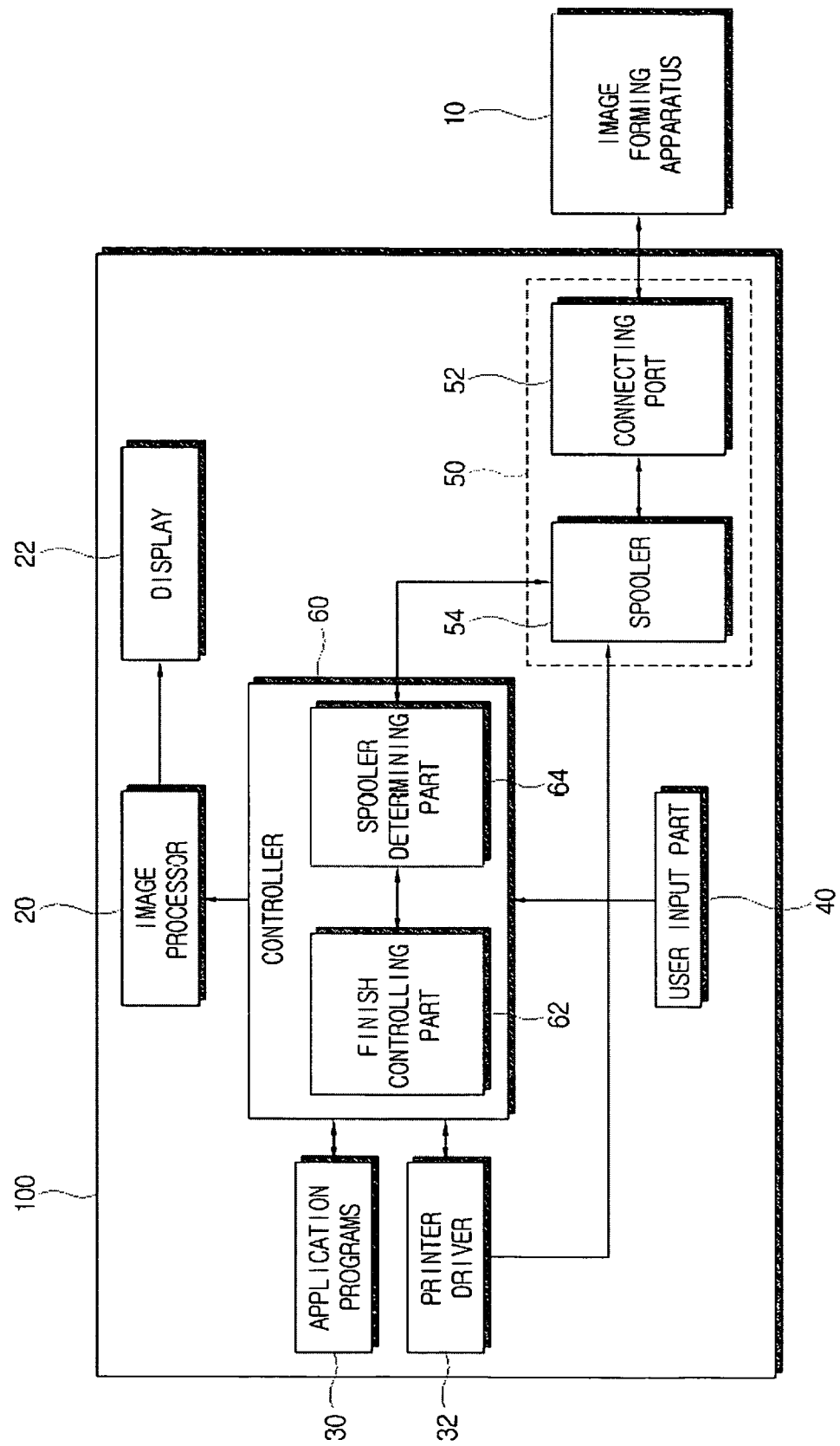
FIG. 1 is a control block diagram of a computer system including a computer according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a control block diagram of a computer system including a computer 100 as a host apparatus according to an embodiment of the present invention. As shown in FIG. 1, the computer system generally includes an image forming apparatus 10 and the computer 100 connected to the image forming apparatus 10 to perform a printing operation.

The image forming apparatus 10 is connected to the computer 100 to allow for data communication therebetween. The image forming apparatus 10 prints results that are output from the computer on a print paper (or some other form of recording medium, i.e., transparency). The image forming apparatus 10 receives printing data corresponding to a document or an image made or edited in the computer 100. Then, the image forming apparatus 10 converts the printing data received from the computer 100 into a print language meeting pre-set print conditions, prints the print data on a record medium, such as paper, using colored dyes such as ink or toner, and outputs a result of the printing. The image forming apparatus 10 may be provided in various kinds of apparatuses such as a printer, a multifunction copier.

The computer 100 transfers the printing data to the image forming apparatus 10. The computer 100 includes an image processor 20, a display 22, application programs 30, a printer driver 32, a user input part 40, an interface 50, and a controller 60. The image processor 20 provides images to be displayed on the display 22 under control of the controller 60. Specifically, the image processor 20 outputs image signals to display document images or picture data created and/or generated by the application program 30, or images of a print information selection menu and the like generated by the printer driver 32, to the display 22 under control of the controller 60. The application programs 30 include various kinds of programs which may be used by the user to make or edit various kinds of documents.

The printer driver 32 converts image data according to the document or picture data created and/or generated by the application programs 30 into the printing data, which may be recognized and/or interpreted by the image forming apparatus 10. In addition, the printer driver 32 provides a print information selection menu signal to the image processor 20 such that the print information selection menu, which allows the user to select various kinds of print information on the document or the image data to be printed, is displayed on the display 22.

For example, when the user inputs a print instruction to the computer 100 while editing the document displayed on the display 22 using one of the application programs 30, the controller 60 of the computer 100 controls the printer driver 32 to display the print information selection menu, which allows the user to select the number of copies to be printed, a printing paper, a printing type, a printing range and the like, on the display 22. Thus, the user is able to perform a desired printing operation by selecting various kinds of print information on the print information selection menu.

The user may turn off the computer 100 by selecting operating system-finishing (hereinafter referred to as system-finishing) in an operating system (OS) of the computer 100 using the user input part 40. The user input part 40 may be provided as an input device connected to the computer 100 (e.g., a mouse (not shown) and a keyboard (not shown), or a wireless remote controller). In an embodiment of the invention in which a computer 100 employs a Windows operating system, the user's selection of system-finishing results in a Windows shutdown program being selected.

The interface 50 is connected to the image forming apparatus 10 to provide for the data communication between the image forming apparatus 10 and the computer 100. The interface 50 transfers the printing data to the image forming apparatus 10. The interface 50 includes a connecting port 52 to which a connecting cable (not shown) of the image forming apparatus 10 is connected to interconnect the image forming apparatus 10 and the computer 100, and a spooler 54 to transfer the printing data generated in the printer driver 32 to the image forming apparatus 10 via the connecting port 52.

The spooler 54 receives and stores the printing data from the printer driver 32, and sequentially transfers the stored printing data to the image forming apparatus 10 via the connecting port 52. In this case, when the print instruction is executed, a transfer process time taken for the printer driver 32 to perform a transfer process in which the printing data is transferred to the image forming apparatus 10, including a time required for a conversion of the document into the printing data, corresponds to a time required for all of the printing data to be stored in the spooler 54. A transfer completion time taken for the computer 100 to complete a transfer operation of actually transferring the transfer-processed printing data to the image forming apparatus 10 corresponds to a time for which the spooler 54 transfers the stored printing data to the image forming apparatus 10. That is, the spooler 54 stores all the printing data input from the printer driver 32 at a higher speed and provides the stored printing data to the image forming apparatus 10 at a lower speed. In this case, the spooler 54 may conduct data communication with a controller of the image forming apparatus 10 so that the spooler 54 is able to detect a state of a progression of the printing operation corresponding to the printing data. In accordance with an embodiment of the invention, the spooler 54 is embodied by a software program installed in the computer 100.

When the system-finishing is selected through the user input part 40, the controller 60 confirms the presence or absence of a printing operation based on the interface 50. Then, if the printing operation is confirmed to be present, the controller 60 displays a finish selection message indicating an after-print system finish item on the display 22.

In addition, when the application program 30 is selected through the user input part 40, the controller 60 controls the image processor 20 to display an image of a document or picture data created and/or generated by the selected application programs 30 on the display 22. In addition, when the print instruction is input through the user input part 40 in the application programs 30, the controller 60 controls the printer driver 32 and the image processor 20 to display the print information selection menu on the display 22. Thus, the user is able to cause a desired printing operation to be performed by selecting various kinds of print information on the print information selection menu.

The controller 60 includes a spooler determining part 64 and a finish controlling part 62. The spooler determining part 64 determines whether the spooler 54 transfers the printing data to the image forming apparatus 10 under control of the finish controlling part 62. The finish controlling part 62 determines whether the system-finishing is selected in the OS through the user input part 40, and, if the system-finishing is determined to be selected, controls the spooler determining part 54 to confirm the transfer state of the printing data. In this case, the finish controlling part 62 may determine whether the system-finishing is selected in the OS by executing the Window shutdown program. If the printing data are determined as being transferred to the image forming apparatus 10 through the spooler determining part 64, the finish controlling part 62 controls the image processor 20 to display the finish selection message indicating the after-print system finish item on the display 22. In this case, the finish controlling part 62 may control the image processor 20 to display the finish selection message made by adding the after-print system finish item to a basic finish selection message including general system finish items.

In an alternative embodiment, the finish controlling part 62 may control the image processor 20 to display the basic finish selection message including the general system finish items and the finish selection message indicating the after-print system finish item, separately. Further, the finish controlling part 62 may control the image processor 20 to display the finish selection message indicating the after-print system finish item.

Hereinafter, the finish selection message, in which the after-print system finish item for system-finishing after completion of the transfer of the printing data to the image forming apparatus 10 is added to the basic finish selection message, is described with reference to the illustrations in FIG. 3.

Figure 3:
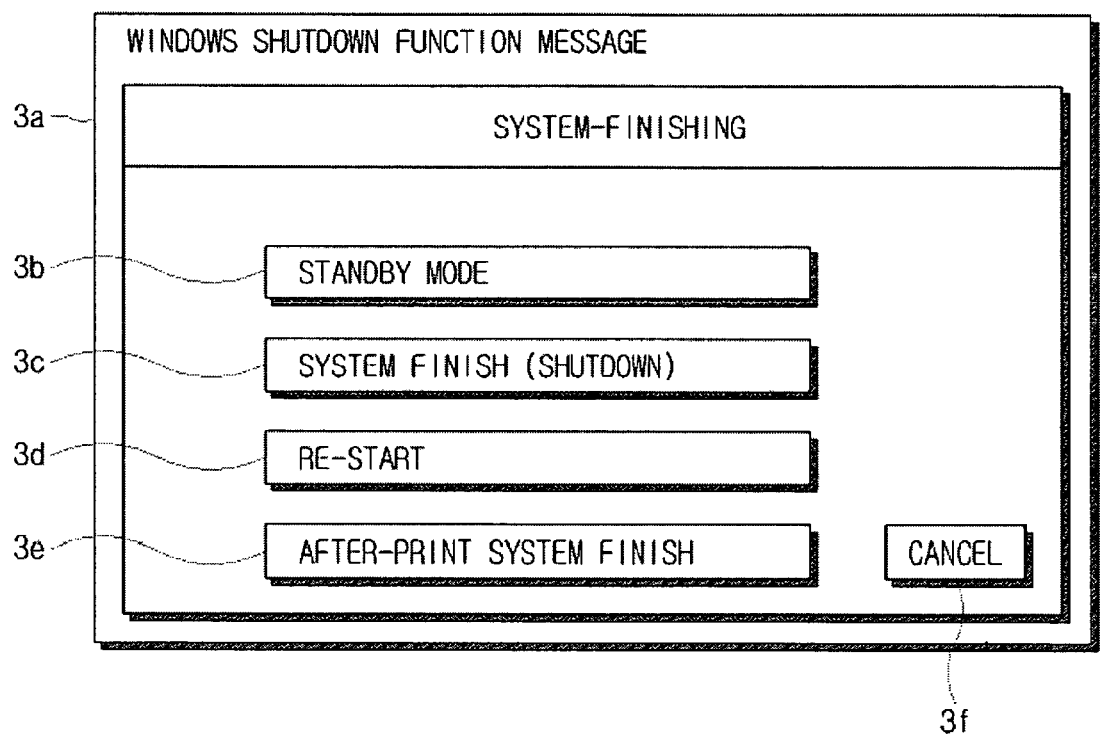
FIG. 3 is an exemplary view for a finish selection message shown in the computer according to an embodiment of the present invention.

As shown in FIG. 3, if the printing data are being transferred to the image forming apparatus 10 when the system-finishing is selected, a Windows shutdown function message 3a is displayed on the display 22. In this case, the Windows shutdown function message 3a corresponds to the finish selection message in which the after-print system finish item is added to the basic finish selection message.

An "after-print system finish" item 3e for system-finishing after the completion of the transfer of the printing data to the image forming apparatus 10 is displayed in the Windows shutdown function message 3a. In addition, the Windows shutdown function message 3a may include a "system finish (shutdown)" item 3c to provide for instant system-finishing irrespective of whether the transfer operation of the printing data is completed, a "re-start" item 3d to provide for system-rebooting, a "cancel" item 3f to provide for cancellation of the system-finishing, and a "standby mode" item 3b to provide for an entrance into a standby mode. In this case, the standby mode item 3b, the system finish (shutdown) item 3c, the restart item 3d, and the cancel item 3f correspond to the general system finish items.

When the "after-print system finish" item 3e is selected from the Windows shutdown function message 3a, the finish controlling part 62 repeatedly determines whether the transfer operation of the printing data is completed based on the result of the determination of the spooler determining part 64. If the transfer operation of the printing data is determined to be completed, the finish controlling part 62 finishes the system.

On the other hand, when one of the general system finish items is selected from the displayed Window shutdown function message 3a, the finish controlling part 62 controls the spooler determining part 64 to perform an operation for the selected item as opposed to a determining operation based on the spooler 54. For example, the finish controlling part 62 controls the system to enter the standby mode when the "standby mode" item 3b is selected, disregards the printing data being transferred, and finishes the system when the "system finish (shutdown)" mode 3c is selected. In this embodiment, the finish controlling part 62 and the spooler determining part 64 may be included in the OS installed in the computer 100, and the above-described functions of the finish controlling part 62 and the spooler determining part 64 may be realized by the OS installed in the computer 100.

If no printing data being transferred to the image forming apparatus 10 through the spooler determining part 64 is determined to exist when the system-finishing is selected, the finish controlling part 62 controls the image processor 20 to display the basic finish selection message, which does not include the after-print system finish item and indicates the general system finish items, on the display 22. For example, the finish controlling part 62 controls the image processor 20 to display the basic finish selection message, which includes the "system finish (shutdown)" item 3c, the "re-start" item 3d, and the "cancel" item 3f.

With Windows shutdown function message 3a, as configured above, when the system-finishing is selected in the OS, the host apparatus (i.e., the computer 100) determines whether the printing data being transferred from the spooler 54 to the image forming apparatus 10 exists, and, if printing data exists, displays the finish selection message (i.e., the Window shutdown function message 3a) including the "after-print system finish" item 3e.

Figure 2:
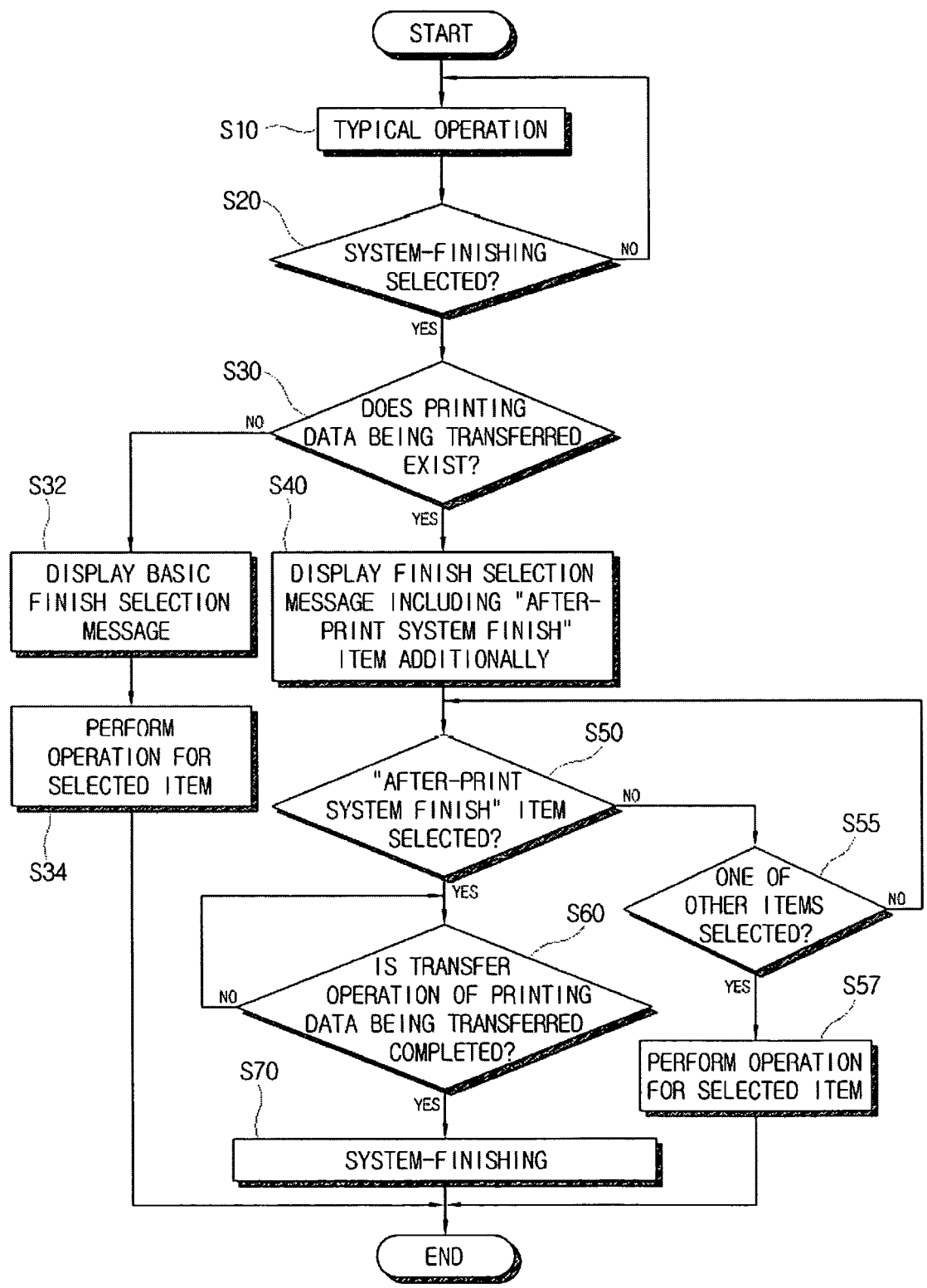
FIG. 2 is a control flow chart for a system finishing method according an embodiment of the present invention.

Hereinafter, a control flow chart for a system finishing method according to an embodiment of the present invention will be described with reference to FIG. 2. The reference numerals in FIG. 1 will be cited in the following description. First, the computer 100 performs a typical operation, such as displaying images of documents or picture data created and/or generated by executing application programs 30 on the display 22 or performing a printing operation after displaying the print information selection menu on the display 22 according to an input print instruction, at operation S10. The finish controlling part 62 determines whether the system-finishing is selected in the OS through the user input part 40 at operation S20. If the system-finishing is selected, the finish controlling part 62 controls the spooler determining part 54 to determine whether the printing data being transferred to the image forming apparatus 10 exists at operation S30.

If the spooler determining part 64 determines that printing data being transferred exists, the finish controlling part 62 controls the image processor 20 to display the finish selection message including the after-print system finish item on the display 22 at operation S40. Then, for example, the Windows shutdown function message 3a is displayed on the display 22, as shown in FIG. 3. In this case, the Windows shutdown function message 3a corresponds to the finish selection message in which the after-print system finish item is added to the basic finish selection message. The finish controlling part 62 determines whether the after-print system finish item is selected from the displayed finish selection message at operation S50, and, if the after-print system finish item is selected, repeatedly determines whether the transfer operation of the printing data is completed through the spooler determining part 64, at operation S60.

If the transfer operation is determined to be completed at operation S60, the finish controlling part 62 finishes the system to turn the computer 100 off at operation S70. At this time, according to embodiments of the invention, only the computer 100 may be powered off and the image forming apparatus 10 may remain powered on.

On the other hand, if, at operation S50, the after-print system finish item is not found to be selected, the finish controlling part 62 determines whether one of the remaining items is selected at operation S55. If one of the remaining items is found to be selected, the finish controlling part 62 controls the spooler determining part 64 to perform an operation for the selected item as opposed to a determining operation based on the spooler 54. For example, the finish controlling part 62 controls the system to enter the standby mode when the "standby mode" item 3b is selected from the Window shutdown function message 3a as shown in FIG. 3, and disregards the printing data being transferred and finishes the system when the "system finish (shutdown)" mode 3c is selected.

On the other hand, if the spooler determining part 64 determines, at operation S30, that no printing data being transferred exists, the finish controlling part 62 controls the image processor 20 to display the basic finish selection message, which does not include the after-print system finish item, on the display 22 at operation S32. For example, the finish controlling part 62 controls the image processor 20 to display the basic finish selection message, which includes the "system finish (shutdown)" item 3c, the "re-start" item 3d, and the "cancel" item 3f. Then, the finish controlling part 62 performs an operation for one item selected from the basic finish selection message at operation S34.

In accordance with aspects of the invention, the image forming apparatus 10 and the computer 100 are connected over a network. This network may be embodied as a local area network (LAN), a wireless network (e.g., Bluetooth communications), other similar networks, and/or combinations thereof.

In addition, accordance with aspects of the present invention, the methods described above may be embodied as computer readable media having a program or programs stored thereon to execute the methods described above.

As is described above, in the host apparatus according to aspects of the present invention and the system finishing method thereof, when the system-finishing is selected, whether the printing data being transferred from the spooler 54 to the image forming apparatus 10 exists is determined, and, if the printing data being transferred is determined to exist, the finish selection message including the after-print system finish item is displayed. Accordingly, when the system-finishing is selected while the printing data are being transferred to the image forming apparatus 10, the host apparatus of the present invention may lead the user to select the after-print system finish item and may automatically finish the system after the transfer operation of the printing data is completed when the after-print system finish item is selected. As a result, the host apparatus according to aspects of the present invention allows the user to avoid an inconvenience of selecting the system-finishing after waiting until the transfer operation of transferring the printing data to the image forming apparatus is completed.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A system finishing method of a host apparatus communicating with an image forming apparatus to perform a printing operation, comprising:

selecting system-finishing in an operating system (OS) of the host apparatus;

confirming a presence or absence of the printing operation of the host apparatus;

if the printing operation of the host apparatus exists, displaying a finish selection message including an after-print system finish item; and when the after-print system finish item is selected, automatically finishing the system after completing the existing printing operation, wherein the confirming of the presence or absence of the printing operation of the host apparatus comprises confirming whether printing data are transferred from the host apparatus to the image forming apparatus, wherein the confirming of whether the printing data are transferred from the host apparatus to the image forming apparatus comprises confirming whether the printing operation is stored in a spooler to transfer the printing data to the image forming apparatus, and wherein the finish selection message is an operating system shutdown function message corresponding to a finish selection message in which the after-print system finish item is added to a basic finish selection message.

2. The system finishing method according to claim 1, wherein the finishing the system automatically after completing the existing printing operation further comprises repeatedly determining whether a transfer of the printing data is completed.

3. The system finishing method according to claim 2, wherein the displaying of the finish selection message comprises displaying the after-print system finish item added to a basic finish selection message including general system finish items.

4. The system finishing method according to claim 3, further comprising displaying the basic finish selection message including the general system finish items if no printing operation of the host apparatus exists.

5. The system finishing method according to claim 2, wherein the displaying of the finish selection message comprises separately displaying a basic finish selection message including general system finish items and the finish selection message including the after-print system finish item.

6. The system finishing method according to claim 5, further comprising displaying the basic finish selection message including the general system finish items if no printing operation of the host apparatus exists.

7. The system finishing method according to claim 1, wherein the selecting of the system-finishing comprises selecting a Windows shutdown program.

8. A host apparatus communicating with an image forming apparatus to perform a printing operation, comprising:
a user input part to select system-finishing in an operating system (OS) of the host apparatus;
an interface connected to the image forming apparatus to transfer printing data to the image forming apparatus; and
a controller to confirm the a presence or absence of the printing operation based on the interface when the system-finishing is selected through the user input part, and, if the printing operation exists, to display a finish selection message including an after-print system finish item,
wherein the interface comprises a connecting port connected to the image forming apparatus and a spooler to transfer the printing data to the image forming apparatus via the connecting port,
wherein the controller comprises a spooler determining part to determine a transfer state of the printing data transferred to the image forming apparatus based on the spooler and a finish controlling part to control the spooler determining part to confirm the transfer state of the printing data when the system-finish is selected through the user input part, and if the spooler determining part confirms that the printing, data are being transferred to the image forming apparatus, to display the finish selection message indicating the after-print system finish item,
wherein when the after-print system finish item is selected, the controller finishes the system automatically after completing the existing printing operation, and
wherein the finish selection message is an operating system shutdown function message corresponding to a finish selection message in which the after-print system finish item is added to a basic finish selection message.

9. The host apparatus according to claim 8, wherein when the after-print system finish item is selected, the controller repeatedly determines whether a transfer of the printing data is completed.

10. The host apparatus according to claim 9, wherein, if the printing operation exists, the controller displays the after-print system finish item added to a basic finish selection message including general system finish items.

11. The host apparatus according to claim 10, wherein, if the printing operation does not exist, the controller displays the basic finish selection message including the general system finish items.

12. The host apparatus according to claim 9, wherein, if the printing operation exists, the controller displays a basic finish selection message including general system finish items and the finish selection message including the after-print system finish item, separately.

13. The host apparatus according to claim 12, wherein, if the printing operation does not exist, the controller displays the basic finish selection message including the general system finish items.

14. The host apparatus according to claim 8, wherein, if it the spooler determining part confirms that the printing data are not being transferred to the image forming apparatus, the finish controlling part displays a basic finish selection message including general system finish items.

15. A method of operating a host apparatus communicating with an image forming apparatus via network, comprising:
selecting that an operating system (OS) of the host apparatus is to be turned off;
confirming a presence or an absence of print data being transferred to the image forming apparatus from the host apparatus;
if the print data exists, displaying a finish selection message including a system finish item, a restart item, a cancel item, and an after-print system finish item and,
if the print data does not exist, displaying a finish selection message indicating only the system finish item, the restart item, and the cancel item, and
when the after-print system finish item is selected, finishing the system automatically after completing the existing printing operation,
wherein the confirming of the presence or the absence of the print data comprises confirming whether a printing operation is stored in a spooler to transfer the print data to the image forming apparatus, and
wherein the finish selection message is an operating system shutdown function message corresponding to a finish selection message in which the after-print system finish item is added to a basic finish selection message.

16. The method according to claim 15, wherein the network is a local area network (LAN), a wireless network, or a combination thereof.

17. A non-transitory computer readable medium having a program stored thereon to execute the method according to claim 15.

18. A host apparatus to communicate with an image forming apparatus, comprising:
a user input part to allow for an input that an operating system (OS) of the host apparatus is to be shut down;
an interface connected to the image forming apparatus to transfer print data to the image forming apparatus: and
a controller to confirm a presence or an absence of print data to be transferred from the host apparatus to the image forming apparatus, to display a finish selection message including a system finish item, a restart item, a cancel item, and an after-print system finish item if the print data exists, and, to display a finish selection message indicating only the system finish item, the restart item, and the cancel item if the print data does not exist,
wherein the interface comprises a connecting port connected to the image forming apparatus and a spooler to transfer the print data to the image forming apparatus via the connecting port, wherein the controller comprises a spooler determining part to determine a transfer state of the print data transferred to the image forming apparatus based on the spooler and a finish controlling part to control the spooler determining part to confirm the transfer state of the print data when the system-finishing is selected through the user input part, and if the spooler determining part confirms that the print data are being transferred to the image forming apparatus, to display the finish selection message indicating the after-print system finish item, wherein when the after-print system finish item is selected, the controller finishes the system automatically after the completion of the transfer of the printing data and the controller repeatedly determines whether the transfer of the printing data is completed, and wherein the finish selection message is an operating system shutdown function message corresponding to a finish selection message in which the after-print system finish item is added to a basic finish selection message.

19. A shutdown method of an apparatus communicating with a printer, comprising:

selecting a shutdown of the apparatus;

confirming a presence or absence of a transfer of printing data to a printer from the apparatus;

if the transfer of the printing data exists, displaying a finish selection message indicating that an automatic shutdown of the apparatus after the transfer of the printing data is completed, and automatically shutting down the apparatus after completing the transfer of the printing data, wherein the confirming of the presence or the absence of the transfer of the printing data comprises confirming whether a printing operation is stored in a spooler to transfer the printing data to the image forming apparatus, and wherein the automatically shutting down the apparatus after completing the transfer of the printing data further comprises repeatedly determining whether the transfer of the printing data is completed.

* * * * *

UNITED STATES PATENT AND TRADEMARK OFFICE
CERTIFICATE OF CORRECTION

| | | |
|---|---|---|
| PATENT NO. | : 8,593,655 B2 | Page 1 of 1 |
| APPLICATION NO. | : 11/650953 | |
| DATED | : November 26, 2013 | |
| INVENTOR(S) | : Myoung-jin Oh | |

It is certified that error appears in the above-identified patent and that said Letters Patent is hereby corrected as shown below:

In the Claims

In Column 9, Line 33, In Claim 8, delete "the a" and insert -- a --, therefor.

Signed and Sealed this
First Day of April, 2014

Michelle K. Lee
*Deputy Director of the United States Patent and Trademark Office*